United States Patent
Bellur et al.

(10) Patent No.: US 9,979,654 B2
(45) Date of Patent: *May 22, 2018

(54) EFFECTIVE BANDWIDTH PATH METRIC AND PATH COMPUTATION METHOD FOR WIRELESS MESH NETWORKS WITH WIRED LINKS

(71) Applicant: Firetide, Inc., Campbell, CA (US)

(72) Inventors: Bhargav Ramachandra Bellur, Bangalore (IN); Ravi Prakash, Santa Clara, CA (US); Amar Singhal, Cupertino, CA (US); Jorjeta Gueorguieva Jetcheva, San Jose, CA (US)

(73) Assignee: Firetide, Inc., Campbell, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/997,879

(22) Filed: Jan. 18, 2016

(65) Prior Publication Data
US 2016/0366059 A1  Dec. 15, 2016

Related U.S. Application Data

(63) Continuation of application No. 13/952,078, filed on Jul. 26, 2013, now Pat. No. 9,240,947, which is a (Continued)

(30) Foreign Application Priority Data

Mar. 9, 2006  (IN) .............................. 627/DEL/2006

(51) Int. Cl.
*H04W 40/00*  (2009.01)
*H04L 12/803*  (2013.01)
(Continued)

(52) U.S. Cl.
CPC ........ *H04L 47/122* (2013.01); *H04L 43/0882* (2013.01); *H04L 45/123* (2013.01);
(Continued)

(58) Field of Classification Search
CPC combination set(s) only.
See application file for complete search history.

(56) References Cited

U.S. PATENT DOCUMENTS 6,842,460 B1  1/2005 Olkkonen et al.
2004/0215687 A1* 10/2004 Klemba .................. H04L 45/00
709/200

OTHER PUBLICATIONS

Bruno et al, Mesh Networks: Commodity Multihop Ad Hoc Networks, 9 pages, Mar. 2005.*
(Continued)

*Primary Examiner* — Frank Duong
(74) *Attorney, Agent, or Firm* — PatentVentures; Bennett Smith; Korbin Van Dyke

(57) ABSTRACT

Enhanced mesh network performance is provided by computation of a path metric with respect to multi-hop paths between nodes in a mesh network and determination of a path through the mesh network that is optimal according to the path metric. Information is communicated in the mesh network according to the determined path. Nodes in the mesh network are enabled to communicate via one or more wireless links and/or one or more wired links. The path metric optionally includes an effective bandwidth path metric having elements (listed from highest to lowest conceptual priority) including an inverse of a sustainable data rate, a number of wireless links, and a number of wireless and wired links. The sustainable data rate is a measure of communication bandwidth that is deliverable by a path for a period of time. Accounting is made for interference between contiguous wireless links operating on the same channel.

23 Claims, 9 Drawing Sheets

Related U.S. Application Data continuation of application No. 12/845,669, filed on Jul. 28, 2010, now Pat. No. 8,498,211, which is a continuation of application No. 11/618,073, filed on Dec. 29, 2006, now Pat. No. 7,768,926.

(51) Int. Cl.
*H04L 12/26* (2006.01)
*H04L 12/721* (2013.01)
*H04W 40/02* (2009.01)
*H04L 12/761* (2013.01)

(52) U.S. Cl.
CPC ............ *H04L 45/124* (2013.01); *H04L 45/16* (2013.01); *H04W 40/02* (2013.01)

(56) References Cited

OTHER PUBLICATIONS

Chiang, Matching Air-Interface With Backbone: End-to-end Resource Allocation in Hybrid Networks, IEEE, 1 page, 2004.*
Examination Report for Indian Application No. 7977/DELNP/2008, dated Jun. 15, 2016, 7 pages.

* cited by examiner

EFFECTIVE BANDWIDTH PATH METRIC AND PATH COMPUTATION METHOD FOR WIRELESS MESH NETWORKS WITH WIRED LINKS

CROSS REFERENCE TO RELATED APPLICATIONS

Priority and Benefit claims for this application are made in the accompanying Application Data Sheet. To the extent permitted by the type of the instant application, this application incorporates by reference for all purposes the following applications, all owned by the owner of the instant application:

India Application Serial No. 627/DEL/2006, filed Mar. 9, 2006, first named inventor Bhargav Ramachandra Bellur, and entitled EFFECTIVE BANDWIDTH PATH METRIC AND PATH COMPUTATION ALGORITHM FOR WIRELESS MESH NETWORKS WITH WIRED LINKS;

U.S. application Ser. No. 11/618,073, now U.S. Pat. No. 7,768,926, filed Dec. 29, 2006, first named inventor Bhargav Ramachandra Bellur, and entitled EFFECTIVE BANDWIDTH PATH METRIC AND PATH COMPUTATION METHOD FOR WIRELESS MESH NETWORKS WITH WIRED LINKS; and U.S. application Ser. No. 12/845,669, now U.S. Pat. No. 8,498,211, filed Jul. 28, 2010, first named inventor Bhargav Ramachandra Bellur, and entitled EFFECTIVE BANDWIDTH PATH METRIC AND PATH COMPUTATION METHOD FOR WIRELESS MESH NETWORKS WITH WIRED LINKS.

U.S. application Ser. No. 13/952,078, now U.S. Pat. No. 9,240,947, filed Jul. 26, 2013, first named inventor Bhargav Ramachandra Bellur, and entitled EFFECTIVE BANDWIDTH PATH METRIC AND PATH COMPUTATION METHOD FOR WIRELESS MESH NETWORKS WITH WIRED LINKS.

BACKGROUND

Field

Advancements in wireless networks are needed to provide improvements in performance, efficiency, and utility of use.

Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes. Nothing herein is to be construed as an admission that any of the references are pertinent prior art, nor does it constitute any admission as to the contents or date of actual publication of these documents.

SYNOPSIS

The invention may be implemented in numerous ways, including as a process, an article of manufacture, an apparatus, a system, a composition of matter, and a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention. The Detailed Description provides an exposition of one or more embodiments of the invention that enable improvements in performance, efficiency, and utility of use in the field identified above. The Detailed Description includes an Introduction to facilitate the more rapid understanding of the remainder of the Detailed Description. The Introduction includes Example Embodiments of systems, methods, and computer readable media in accordance with the concepts taught herein. As is discussed in more detail in the Conclusions, the invention encompasses all possible modifications and variations within the scope of the issued claims.

DETAILED DESCRIPTION

Figure 1:
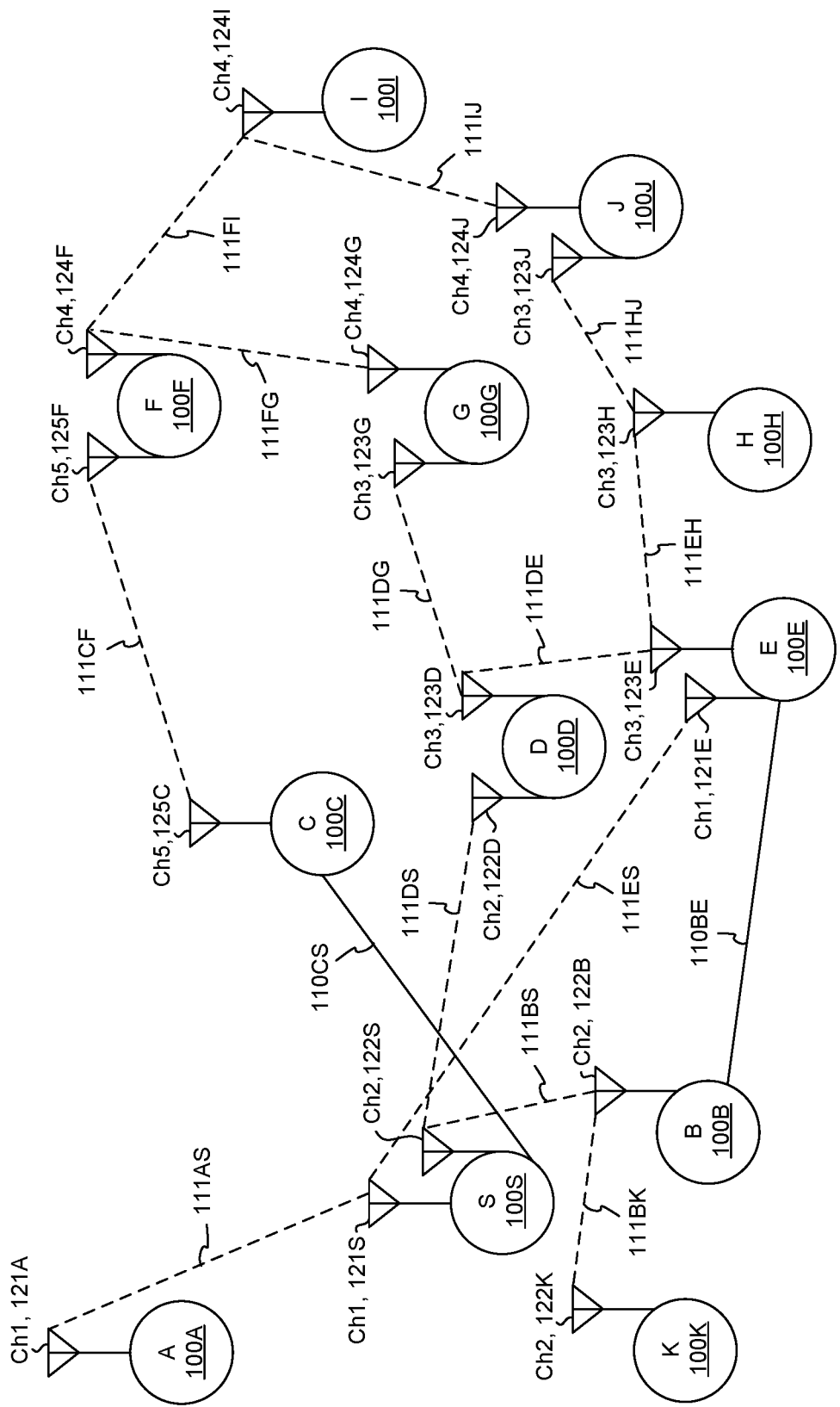
FIG. 1 illustrates an embodiment of a mixed wireless and wired mesh network.

A detailed description of one or more embodiments of the invention is provided below along with accompanying figures that illustrate the principles of the invention. The invention is described in connection with the embodiments. It is well established that it is neither necessary, practical, or possible to exhaustively describe every embodiment of the invention. Thus the embodiments herein are understood to be merely illustrative, the invention is expressly not limited to or by any or all of the embodiments herein, and the invention encompasses numerous alternatives, modifications and equivalents. To avoid monotony in the exposition, a variety of word labels (including but not limited to: first, last, certain, particular, select, and notable) may be applied to separate sets of embodiments; as used herein such labels are expressly not meant to convey quality, or any form of preference or prejudice, but merely to conveniently distinguish among the separate sets. Wherever multiple embodiments serve to illustrate variations in process, method, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the specific details. For the purpose of clarity, technical material that is known in the technical fields related to the invention has not been described in detail so that the invention is not unnecessarily obscured.

Introduction

This introduction is included only to facilitate the more rapid understanding of the Detailed Description. The invention is not limited to the concepts presented in the introduction, as the paragraphs of any introduction are necessarily an abridged view of the entire subject and are not meant to be an exhaustive or restrictive description. For example, the introduction that follows provides overview information limited by space and organization to only certain embodiments. There are in fact many other embodiments, including those to which claims will ultimately be drawn, which are discussed throughout the balance of the specification.

Enhanced mesh network performance is provided by computation of a path metric with respect to multi-hop paths between nodes in a mesh network and determination of a path through the mesh network that is optimal according to the path metric. Information, such as in the form of data packets, is communicated in the mesh network according to the determined path. Nodes in the mesh network are enabled to communicate via one or more wireless links, one or more wired links, or both. Each wireless link is tuned to a specific channel (i.e. the channel is assigned to or associated with the wireless link), and all wireless links use a single channel or alternatively various wireless links use a plurality of channels, such that communication is enabled to occur in parallel over the channels. The assignment of channels to wireless links is permanent, in some embodiments, or temporary (varying over time), in other embodiments.

The path metric optionally includes an effective bandwidth path metric having elements (listed from highest to lowest conceptual priority) including an inverse of a sustainable data rate, a number of wireless links, and a number of wireless and wired links. The sustainable data rate is a measure of communication bandwidth that is deliverable by a path for a significant period of time. A higher sustainable data rate indicates a relatively better path. The number of wireless links is a measure of the amount of wireless communication resources used along the path. A lower number of wireless links indicates a relatively better path. The number of wireless and wired links (or total links) is a measure of wireless and wired communication resources used along the path. A lower number of total links indicates a relatively better path.

The path through the mesh network is managed by one or more mesh routing protocols. The routing protocols optionally stores topological information about the mesh network according to links, where a link between a pair of nodes in the mesh network indicates the pair of nodes is enabled to communicate with each other. In some usage scenarios, a path between the pair of mesh nodes traverses other mesh nodes and thus includes one or more links. In other words, a path having a single link indicates the pair of mesh nodes are enabled to communicate directly with each other, and a path having two or more links indicates corresponding intermediary nodes. A routing protocol optionally computes a path between two mesh nodes based on links (and associated link characteristics) the routing protocol is aware of. The path computation optionally discovers a path having a highest (or relatively higher) throughput (or bandwidth). The path computation optionally finds a path having a lowest (or a relatively lower) traversal latency. The path computation optionally determines a path having a lowest (or relatively lower) packet loss. Various path computations are directed to select a path according to any computation of maximized bandwidth, minimized latency, and minimized packet loss, according to various embodiments. The computed path is then optionally used for delivering traffic between the nodes the path is between.

Links in a mesh network are wireless, wired, or both, and each node in the mesh implements any number and combination of wireless and wired interfaces. Transmissions via the wireless interfaces are broadcast in nature, so any two wireless interfaces that are tuned to the same channel and are within transmission range of each other optionally form a wireless link. Similarly, any two wired interfaces that are coupled together optionally form a wired link.

Wireless transmissions on the same channel interfere with each other when transmitting nodes are within interference range of each other. However, wireless transmissions on non-overlapping channels do not interfere with each other. Thus a node having more than one wireless interface, each assigned to a unique channel, is enabled to simultaneously communicate via each of the wireless interfaces. Wired transmissions, in contrast, do not interfere with transmissions on any other wired or wireless links.

Each link has an associated link metric or cost that reflects desirability of the link with respect to forwarding traffic, i.e. a link having a lower cost is relatively more attractive for communicating data. Some metrics have associated multiple characteristics or sub-metrics that are combinable in various ways to arrive at an overall link metric. Link sub-metrics include any combination of raw data rate, link utilization, tendency of the link to lose data (referred to as lossy-ness hereinafter), available bandwidth, and other characteristics of the link.

Various combinations of metrics and other relevant characteristics (such as current channel assignment) associated with each link are used by a mesh routing protocol to compute best or relatively better paths for delivering traffic between nodes of the mesh network. A path metric or cost is a function of the individual link metrics, costs, and characteristics associated with the links of the path. Various path metrics are computed for the same path according to differently chosen individual link metrics, costs, and characteristics, and differing manners of combining the individual link metrics, costs, and characteristics, according to various embodiments.

The path metric computation is performed for a mesh network having a known set of links, each operating according to a respective channel assignment, and each having respective associated cost metrics. The path metric computation provides a set of best paths from each node in the mesh network to all other nodes in the mesh network, i.e. the most efficient communication pathways between the nodes of the mesh network.

FIG. 1 illustrates an embodiment of a mixed wireless and wired mesh network having a collection of nodes each including at least one wireless interface (such as Node 100A having wireless interface 121A operating on channel 1). Some of the nodes include more than one wireless interface (such as Node 100S having wireless interfaces 121S and 122S operating on channels 1 and 2, respectively). Some of the nodes include a wired interface (such as Nodes 100C and 100S having respective wired interfaces coupled to wired link 110CS). Communications traveling via wireless links on the same channel (such as wireless links 111BS and 111DS on channel 2) may interfere with each other, but do not interfere with transmissions on other channels. Communications carried via wired links (such as via wired links 110CS and 110BE) do not interfere with each other or any other wireless link.

In the figure, element identifiers beginning with "100" are associated with nodes of the mesh network (such as Nodes 100A and 100B). Element identifiers beginning with "12" are representative of wireless interfaces, with the third character of the identifier describing a channel associated with the wireless interface, and the last character of the identifier indicating the node the wireless interface is included in. An example of a wireless interface identifier is wireless interface 125F operating on channel 5 and included in Node 100F. Element identifiers starting with "111" represent wireless links formed via wireless interfaces, with the fourth and last characters of the identifier indicating nodes the wireless link couples. An example of a wireless link is wireless link 111EH coupling Nodes 100E and 100H. Element identifiers starting with "110" are used for wired links, with the fourth and last characters of the identifier indicating nodes the wired link couples. An example of a wired link is wired link 110BE coupling Nodes 100B and 100E.

Example Embodiments

In concluding the introduction to the detailed description, what follows is a collection of example embodiments, providing additional description of a variety of embodiment types in accordance with the concepts taught herein; these examples are not meant to be mutually exclusive, exhaustive, or restrictive; and the invention is not limited to these example embodiments but rather encompasses all possible modifications and variations within the scope of the issued claims.

A first illustrative combination of a system comprising means for determining an effective wireless bandwidth for a path according to one of a plurality of techniques, the path having a length of contiguous wireless links; and means for selecting one of the techniques based at least in part on the length.

The first illustrative combination further comprising means for determining a best path through a mesh network that includes the contiguous wireless links. The foregoing illustrative combination further comprising means for routing traffic according to the best path. The foregoing illustrative combination wherein the mesh network includes a plurality of nodes. The foregoing illustrative combination wherein at least two of the nodes are enabled to route a portion of the traffic via a wired link. The foregoing illustrative combination wherein at least a pair of the nodes are enabled to route the portion of the traffic via a wireless link. The foregoing illustrative combination wherein the wireless link is one of the contiguous wireless links.

The first illustrative combination wherein the means for selecting selects a first one of the techniques if the length is less than a threshold. The foregoing illustrative combination wherein the means for selecting selects a second one of the techniques if the length is greater than the threshold. The foregoing illustrative combination wherein the means for selecting selects the second one of the techniques if the length is equal to the threshold.

The first illustrative combination wherein the means for determining comprises means for calculating the effective wireless bandwidth as a function of a reciprocal of an inverse effective data rate, the inverse effective data rate being a sum of respective reciprocal bandwidths corresponding to each of the contiguous wireless links.

The first illustrative combination wherein the means for determining comprises means for calculating the effective wireless bandwidth as a function of a plurality of inverse effective data rates, each of the inverse effective data rates corresponding to a respective set of contiguous wireless links, the sets of contiguous wireless links including all sequences of wireless links in the contiguous wireless links having a respective length equal to a threshold. The foregoing illustrative combination wherein the function selects a minimum bandwidth based at least in part on the inverse effective data rates. The foregoing illustrative combination wherein the minimum bandwidth corresponds to a minimum of reciprocals of the inverse effective data rates.

A second illustrative combination of a system comprising a processor; at least one interface coupled to the processor; wherein the processor is enabled to execute instructions to determine an effective wireless bandwidth of a path according to one of a plurality of techniques selected based at least in part on a length of the path; and wherein the path is via a plurality of contiguous wireless links equal in number to the length.

The foregoing illustrative combination wherein the interface is at least one of a wireless interface and a wired interface. The foregoing illustrative combination wherein the processor is further enabled to execute further instructions to determine a best path through a mesh network that includes the contiguous wireless links. The foregoing illustrative combination wherein the processor is further enabled to execute additional instructions to route traffic according to the best path. The foregoing illustrative combination wherein the processor is included in one of a plurality of nodes included in the mesh network. The foregoing illustrative combination wherein the at least one interface implements an endpoint of at least one link of the contiguous wireless links.

A third illustrative combination of a method comprising of computing an effective wireless bandwidth for a path according to one of a plurality of techniques selected based at least in part on a length of the path; and wherein the path is via a plurality of contiguous wireless links equal in number to the length.

A fourth illustrative combination of the third illustrative combination further comprising computing a best path through a mesh network that includes the contiguous wireless links. A fifth illustrative combination of the fourth illustrative combination further comprising routing traffic according to the best path.

A sixth illustrative combination of a computer readable medium having a set of instructions stored therein which when executed by a processing element causes the processing element to perform operations comprising computing an effective wireless bandwidth for a path according to one of a plurality of techniques selected based at least in part on a length of the path; wherein the path is via a plurality of contiguous wireless links equal in number to the length.

Any of the second, third, and sixth illustrative combinations, wherein a first one of the techniques is selected if the length is less than a threshold. The foregoing illustrative combination wherein a second one of the techniques is selected if the length is greater than the threshold. The foregoing illustrative combination wherein the second one of the techniques is selected if the length is equal to the threshold.

Any of the second, third, and sixth illustrative combinations, wherein at least one of the techniques includes calculating the effective wireless bandwidth as a function of a reciprocal of an inverse effective data rate, the inverse effective data rate being a sum of respective reciprocal bandwidths corresponding to each of the contiguous wireless links.

Any of the second, third, and sixth illustrative combinations, wherein at least one of the techniques includes calculating the effective wireless bandwidth as a function of a plurality of inverse effective data rates, each of the inverse effective data rates corresponding to a respective set of contiguous wireless links, the sets of contiguous wireless links including all sequences of wireless links in the contiguous wireless links having a respective length equal to a threshold. The foregoing illustrative combination wherein the function selects a minimum bandwidth based at least in part on the inverse effective data rates. The foregoing illustrative combination wherein the minimum bandwidth corresponds to a minimum of reciprocals of the inverse effective data rates.

A seventh illustrative combination of the sixth illustrative combination wherein the operations further comprise computing a best path through a mesh network that includes the contiguous wireless links. An eighth illustrative combination of the seventh illustrative combination wherein the operations further comprise routing traffic according to the best path.

Any of the fifth and eighth illustrative combinations, wherein the mesh network includes a plurality of nodes. The foregoing illustrative combination wherein at least two of the nodes are enabled to route a portion of the traffic via a wired link. The foregoing illustrative combination wherein at least a pair of the nodes are enabled to route the portion of the traffic via a wireless link. The foregoing illustrative combination wherein the wireless link is one of the contiguous wireless links.

A ninth illustrative combination of a system comprising means for evaluating a first cost associated with traversing a first path of links in a mesh network, the first path being associated with a source node and a destination node of the mesh network; means for evaluating a second cost associated with traversing a second path of links in the mesh network, the second path being associated with the source and the destination nodes; wherein the last link of the first path is a wired link; and wherein the last link of the second path is a wireless link.

The foregoing illustrative combination wherein the first cost is a first current cost and the first path is a first current path; and further comprising means for replacing a first minimum cost having an associated first best path with the first current cost and replacing the first best path with the first current path if the first current cost is less than the first minimum cost. The foregoing illustrative combination wherein the second cost is a second current cost and the second path is a second current path; and further comprising means for replacing a second minimum cost having an associated second best path with the second current cost and replacing the second best path with the second current path if the second current cost is less than the second minimum cost. The foregoing illustrative combination further comprising means for selecting a routing path that corresponds to the respective best path associated with the minimum of the first and the second minimum costs. The foregoing illustrative combination further comprising means for routing traffic along the routing path.

The ninth illustrative combination wherein the means for evaluating the first cost comprises means for determining an effective bandwidth for any contiguous wireless links along the first path. The ninth illustrative combination wherein the means for evaluating the second cost comprises means for determining an effective bandwidth for any contiguous wireless links along the second path.

A tenth illustrative combination of a system comprising a processor; at least one interface coupled to the processor; wherein the processor is enabled to execute instructions to determine respective first and second costs associated with traversing respective first and second paths of links in a mesh network; wherein the last link of the first path is a wired link; and wherein the last link of the second path is a wireless link.

The foregoing illustrative combination wherein the interface is at least one of a wireless interface and a wired interface. The foregoing illustrative combination wherein each of the paths are associated with a source node and a destination node. The foregoing illustrative combination wherein the first cost is a first current cost and the first path is a first current path; and wherein the processor is further enabled to execute further instructions to replace a first minimum cost having an associated first best path with the first current cost and to replace the first best path with the first current path if the first current cost is less than the first minimum cost. The foregoing illustrative combination wherein the second cost is a second current cost and the second path is a second current path; and wherein the processor is enabled to further execute additional instructions to replace a second minimum cost having an associated second best path with the second current cost and to replace the second best path with the second current path if the second current cost is less than the second minimum cost. The foregoing illustrative combination wherein the processor is further enabled to execute other instructions to select a routing path that corresponds to the respective best path associated with the minimum of the first and the second minimum costs.

The tenth illustrative combination wherein the first cost is calculated based at least in part on bandwidth reduction due to any contiguous wireless links along the first path. The tenth illustrative combination wherein the second cost is calculated based at least in part on bandwidth reduction due to any contiguous wireless links along the second path.

An eleventh illustrative combination of a method comprising evaluating respective first and second costs associated with traversing respective first and second paths of links in a mesh network; wherein the last link of the first path is a wired link; and wherein the last link of the second path is a wireless link.

The foregoing illustrative combination wherein each of the paths are associated with a source node and a destination node. The foregoing illustrative combination wherein the first cost is a first current cost and the first path is a first current path; and further comprising if the first current cost is less than a first minimum cost associated with a first best path, then replacing the first minimum cost with the first current cost and replacing the first best path with the first current path. The foregoing illustrative combination wherein the second cost is a second current cost and the second path is a second current path; and further comprising if the second current cost is less than a second minimum cost associated with a second best path, then replacing the second minimum cost with the second current cost and replacing the second best path with the second current path. The foregoing illustrative combination further comprising selecting a routing path that corresponds to the respective best path associated with the minimum of the first and the second minimum costs. The foregoing illustrative combination further comprising routing traffic along the routing path.

The eleventh illustrative combination wherein the evaluating of the first cost comprises determining an effective bandwidth for any contiguous wireless links along the first path. The eleventh illustrative combination wherein the evaluating of the second cost comprises determining an effective bandwidth for any contiguous wireless links along the second path.

A twelfth illustrative combination of a computer readable medium having a set of instructions stored therein which when executed by a processing element causes the processing element to perform operations comprising computing respective first and second costs associated with traversing respective first and second paths of links in a mesh network, each of the paths being associated with a source node and a destination node of the mesh network; wherein the last link of the first path is a wired link; and wherein the last link of the second path is a wireless link.

The foregoing illustrative combination wherein the first cost is a first current cost and the first path is a first current path; and wherein the operations further comprise if the first current cost is less than a first minimum cost associated with a first best path, then replacing the first minimum cost with the first current cost and replacing the first best path with the first current path. The foregoing illustrative combination wherein the second cost is a second current cost and the second path is a second current path; and wherein the operations further comprise if the second current cost is less than a second minimum cost associated with a second best path, then replacing the second minimum cost with the second current cost and replacing the second best path with the second current path. The foregoing illustrative combination wherein the operations further comprise selecting a routing path that corresponds to the respective best path associated with the minimum of the first and the second minimum costs. The foregoing illustrative combination wherein the operations further comprise routing traffic along the routing path.

The twelfth illustrative combination wherein the operations further comprise calculating a bandwidth reduction due to any contiguous wireless links along the first path. The foregoing illustrative combination wherein the first cost is based at least in part on the bandwidth reduction. The twelfth illustrative combination wherein the operations further comprise calculating a bandwidth reduction due to any contiguous wireless links along the second path. The foregoing illustrative combination wherein the second cost is based at least in part on the bandwidth reduction.

A thirteenth illustrative combination of a method comprising determining an effective wireless bandwidth for a path according to a first technique if a length of the path is less than a threshold; and determining the effective wireless bandwidth according to a second technique if the length is not less than the threshold; and wherein the path is via a plurality of contiguous wireless links equal in number to the length.

The thirteenth illustrative combination wherein the first technique comprises calculating the effective wireless bandwidth as a function of a reciprocal of an inverse effective data rate, the inverse effective data rate being a sum of respective reciprocal bandwidths corresponding to each of the contiguous wireless links.

The thirteenth illustrative combination wherein the second technique comprises calculating the effective wireless bandwidth as a function of a plurality of inverse effective data rates, each of the inverse effective data rates corresponding to a respective set of contiguous wireless links, the sets of contiguous wireless links including all sequences of wireless links in the contiguous wireless links having a respective length equal to the threshold. The foregoing illustrative combination wherein the function selects a minimum bandwidth based at least in part on the inverse effective data rates. The foregoing illustrative combination wherein the minimum bandwidth corresponds to a minimum of reciprocals of the inverse effective data rates.

A fourteenth illustrative combination of a method comprising determining a best path through a mesh network, the best path being via a plurality of wireless links; routing traffic via the best path; wherein the determining comprises computing an effective wireless bandwidth for a number of contiguous wireless links of the wireless links. The foregoing illustrative combination wherein the best path is further via at least one wired link.

The fourteenth illustrative combination wherein the computing of the effective wireless bandwidth comprises if the number of contiguous wireless links is less than a threshold, then determining the effective wireless bandwidth as a reciprocal of a sum of reciprocal bandwidths corresponding to each of the contiguous wireless links. The foregoing illustrative combination wherein the computing of the effective wireless bandwidth further comprises if the number of contiguous wireless links is not less than the threshold, then determining the effective wireless bandwidth according to a minimum of a set of sums, each of the set corresponding to a respective reciprocal of a respective sum of a respective set of reciprocal bandwidths for each possible path having a respective length equal to the threshold and being encompassed by the contiguous wireless links.

Any of the foregoing illustrative combinations referring to contiguous wireless links wherein the contiguous wireless links operate according to a single channel.

Any of the foregoing illustrative combinations referring to a threshold wherein the threshold is predetermined.

Effective Bandwidth Path Metric

A path metric along a path that includes wireless links is dependent on the level of wireless interference along the path because interference reduces throughput and increases packet latency and loss. Interference, in some usage scenarios, depends on the channel assignment of the wireless links and on the order of wireless and wired links along the path because a wired mesh link may separate the sequence of wireless links before the wired link in the path and the sequence of wireless links after the wired link in the path into non-interfering zones. Therefore, the path metric takes into account not only the individual metrics of each link along a path, but also the order the links appear along the path.

A path metric called "effective bandwidth" is defined that takes into account both wireless and wired links, and incorporates the available bandwidth along each link in the path along with effects of interference of consecutive wireless links in the path that are assigned to the same channel A path computation technique is then defined that given a set of links, computes the best possible paths from a node to all other nodes reachable through the set of links, according to the effective bandwidth path metric. The path metric incorporates the effects of interference along a multi-hop path that includes wireless and wired links, where each node optionally has more than one wireless and/or wired interface.

The effective bandwidth path metric has three components, in lexicographic (or priority) order: inverse of the sustainable data rate, number of wireless links, and total number of links. The inverse of the sustainable data rate is the most significant component of the path metric and is a measure of the inverse of the data rate sustainable on the path. The metric incorporates the current data rate of each link along the path and also depends on the order in which wired and wireless communications links appear in the path, as well as the channel assigned to each wireless link. The lower the inverse of the sustainable data rate (e.g., the higher the sustainable data rate), the better the path.

The number of wireless links along a path is a measure of the amount of wireless communication resources that are used along the path, and reflects the level of interference generated in the network and possibly along the path itself, as well as the probability of packet loss. That is, the more wireless links a packet has to traverse, the more likely the packet will be dropped due to full router queues, or that the packet will collide with other packets if the link is wireless. The smaller the number of wireless links along a path, the more desirable the path.

The total number of links is the least significant part of the path metric, and is a measure of the amount of (wired and wireless) network resources that are used along the path and also reflects the probability of packet loss. The lower the total number of links in a path, the more desirable the path.

Conceptually the way two paths are compared according to the lexicographic ordering of the three components (inverse of the sustainable data rate, number of wireless links, and total number of links) is expressed by the following formula, where InvSR stands for inverse sustainable data rate, W stands for the number of wireless links and N stands for the total number of links along the path. To account for the dynamics of the wireless environment, the path computation technique optionally uses a threshold parameter Delta (e.g., Delta=0.1, 0.2, or some other similar small value) when comparing the reciprocal of the sustainable data rate. The path comparison formula for paths 1 and 2 having respective inverse sustainable data rates of InvSR1 and InvSR2, having respective numbers of wireless links of W1 and W2, and having respective total numbers of wireless links of N1 and N2 is:

(InvSR1, $W1$, $N1$)<(InvSR2, $W2$, $N2$) if (InvSR1/InvSR2<(1−Delta)) OR ((1−Delta)<=InvSR1/InvSR2<=1) AND ($W1<W2$)
OR ((1−Delta)<=InvSR1/InvSR2<=1) AND ($W1==W2$)
AND ($N1<N2$)

Inverse Sustainable Data Rate Computation

The most significant component of the effective bandwidth metric, the inverse sustainable data rate, attempts to measure the effective bandwidth a path is enabled to carry for substantial periods of time.

The inverse sustainable data rate is computed based on the available bandwidth at each link. The available bandwidth is computed by a routing protocol or by a link layer based on information collected at the link layer and also optionally at a network layer. Possible inputs into the computation of the available bandwidth metric are raw data rate, link utilization, link availability, and lossy-ness. Information on the metric associated with a link and its channel assignment is discovered by the routing protocol along with discovering the link itself.

A path is divided into a set of segments (or sub-paths) such that the metric of each segment is computable independently of the metrics of the other segments, and the metric for the entire path is the minimum of the bandwidths of the segments. In some embodiments, segment boundaries are chosen to coincide with wired links, since in some usage scenarios the wired links separate a path into non-interfering segments.

Consider two nodes u and v coupled by link(u,v). Let B(u,v) denote available bandwidth on link(u,v). Consider a segment P* having n links such that the available bandwidth of the $i^{th}$ link is B(i), where $1<=i<=n$. The links in the segment P* are divided into (m+1) different sets, where m is the total number of distinct wireless channels in use in the segment. Set 0 includes all wired links, and Set k includes all wireless links on channel k. For $0<=k<=m$, let SR(P*, k) be the sustainable bandwidth across all the links within segment P* in Set k. Note that transmissions on a link in one set do not interfere with, and are independent of the transmissions on a link in any other set. Hence, the sustainable bandwidth across the segment P* is given by the minimum value of SR(P*, k), for $0<=k<=m$. The minimum value represents the sustainable data rate across segment P* as a scalar value:

SR(P*)=minimum{$0<=k<=m$}SR(P*, k).

A vector representation of the sustainable data rate is a vector of size (m+1):

vectorSR(P*)=(SR(P*, 0), SR(P*, 1) . . . SR(P*, m)).

First consider Set 0, i.e. all wired links within the segment P*. Since transmissions on wired links do not interfere with each other, the sustainable data rate across wired links in the segment P* is given by:

SR(P*, 0)=minimum{$1<=i<=n$ such that link $i$ is a wired link}B(i).

Next consider Set k, i.e. all wireless links within segment P* that are assigned to channel k. Let Assign(i, k) be a Boolean variable that is true if link i is assigned to channel k. Hence, the time required to transmit a bit across all the hops which are on channel k is given by:

T(P*, k)=sum{$1<=i<=n$ such that Assign(i, k) is True}1/B(i).

In the worst case, all links that are assigned to channel k within the segment P* are within interference range of each other. Recall that the sustainable data rate across all the wireless links in Set k within the segment P* is given by SR(P*, k). Therefore, a lower bound on the sustainable data rate SR(P*, k) is given by the inequality SR(P*, k)>=1/T(P*, k). The inequality evolves into a strict equality whenever all the wireless links within a segment assigned to channel k interfere with one another. Hence:

1/SR(P*, k)<=sum{$1<=i<=n$ such that Assign(i, k) is True}1/B(i)

In some usage scenarios, all the wireless links within a segment that are assigned to the same channel do not interfere with each other. This occurs, for example, when the links are not within interference range of one another. In some environments, the interference range is larger than the transmission range, and in some situations is twice as large as the transmission range. Assume that the bandwidth reduction (or degradation) across a sequence of wireless hops ceases (or is ignorable) after IntfHops hops, where IntfHops is a small integer, such as 4 or 5. See the section "Contiguous Wireless Links Sustainable Data Rate", located elsewhere herein, for details of a computation of the sustainable data rate across a contiguous sequence of wireless links on the same channel assuming bandwidth degradation after IntfHops is ignorable.

Returning now to the decomposition of a path P into a series of segments P1, P2 . . . Ph, the scalar and vector representations of the sustainable data rate across the entire path P are respectively:

$$SR(P) = \text{minimum}(SR(P1), SR(P2) \ldots SR(Ph)), \text{ and}$$

$$\text{vectorSR}(P) = \text{vectorMin}(SR(P1), SR(P2) \ldots SR(Ph));$$

where for two vectors vectorX=(X0, X1 . . . Xm) and vectorY=(Y0, Y1 . . . Ym) vectorMin=(minimum(X0, Y0), minimum (X1, Y1) . . . minimum (Xm, Ym)).

It is convenient to use the reciprocal of the sustainable data rate, termed the inverse of the sustainable data rate, and denoted InvSR:

$$\text{InvSR}(P^*) = \text{maximum}\{0 <= k <= m\} \text{InvSR}(P^*, k),$$
where $$\text{InvSR}(P^*, k) = 1/SR(P^*, k).$$

The scalar and vector representations are thus respectively:

$$\text{InvSR}(P) = \text{maximum}(\text{InvSR}(P1), \text{InvSR}(P2) \ldots \text{InvSR}(Ph)), \text{ and}$$

$$\text{vectorInvSR}(P) = \text{vectorMax}(\text{InvSR}(P1), \text{InvSR}(P2) \ldots \text{InvSR}(Ph));$$

where for two vectors vectorX=(X0, X1 . . . Xm) and vectorY=(Y0, Y1 . . . Ym) vectorMax=(maximum(X0, Y0), maximum (X1, Y1) . . . maximum (Xm, Ym)).

Figure 2:
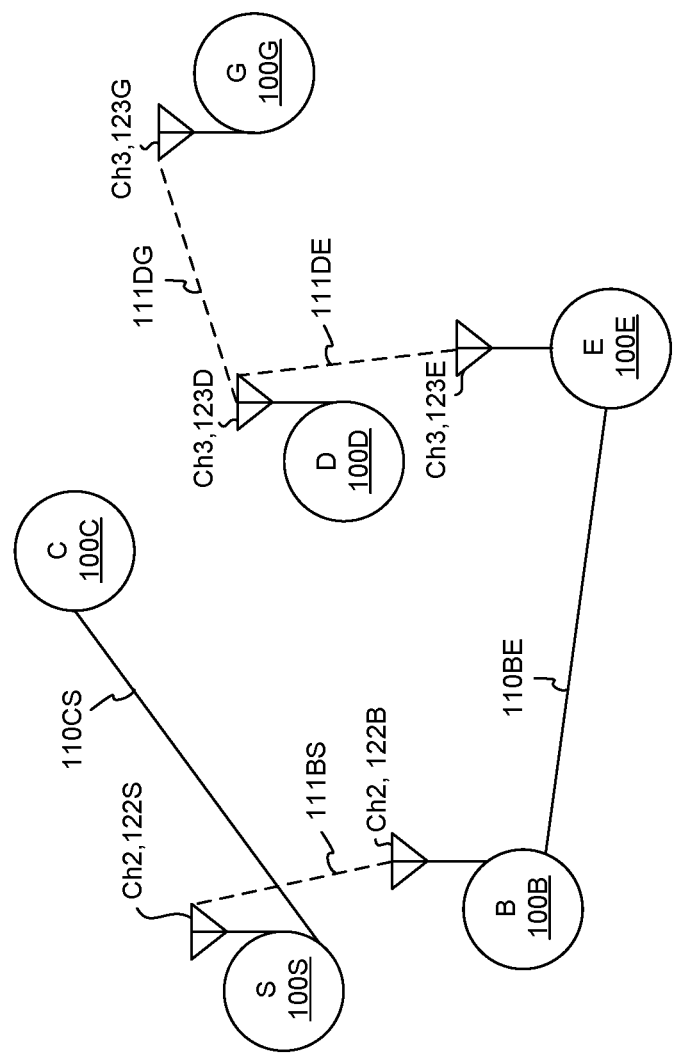
FIG. 2 illustrates portions of the mesh network of FIG. 1 for an example calculation of an effective bandwidth metric.

FIG. 2 illustrates portions of the mesh network of FIG. 1 for an example calculation of an effective bandwidth metric. A five hop path is illustrated, from Node 100G to Node 100C, and is analyzed according to two segments: X (from Node 100G to Node 100B) and Y (from Node 100B to Node 100C). The sustainable data rate along the path is computed according to the two segments X and Y.

For segment X (from Node 100G to Node 100B):

$$\text{InvSR}(X, \text{wired}) = 1/\text{bandwidth}(\text{wired link } 110BE);$$
//Note that "wired" is also optionally known as channel 0

$$\text{InvSR}(X, \text{channel 3}) = 1/\text{bandwidth}(\text{wireless link } 111DG) + 1/\text{bandwidth}(\text{wireless link } 111DE); \text{ and}$$

$$\text{InvSRSegmentX} = \text{maximum}(\text{InvSR}(X, \text{wired}), \text{InvSR}(X, \text{channel 3})).$$

For segment Y (from Node 100B to Node 100C):

$$\text{InvSR}(Y, \text{wired}) = 1/\text{bandwidth}(\text{wired link } 110CS);$$

$$\text{InvSR}(Y, \text{channel 2}) = 1/\text{bandwidth}(\text{wireless link } 111BS); \text{ and}$$

$$\text{InvSRSegmentY} = \text{maximum}(\text{InvSR}(Y, \text{wired}), \text{InvSR}(Y, \text{channel 2})).$$

The (inverse of) the sustainable data rate for the entire path from Node 100G to Node 100C is thus the scalar value:

$$\text{maximum}(\text{InvSRSegmentX}, \text{InvSRSegmentY}).$$

The vector representation is:

$$\text{vectorInvSR} = (\text{InvSR}(\text{wired}), \text{null}, \text{InvSR}(\text{channel 2}), \text{InvSR}(\text{channel 3})),$$

where the null value corresponds to a lack of channel 1 along the path, and $$\text{InvSR}(\text{wired}) = \text{maximum}(\text{InvSR}(X, \text{wired}), \text{InvSR}(Y, \text{wired})).$$

The effective bandwidth metric calculation then combines the inverse sustainable data rate for the path along with the number of wireless and total links for the path. According to the path in FIG. 2, the number of wireless links along the path is three, and the total number of links is five.

Path Computation

An embodiment of a path computation technique is based on the foregoing effective bandwidth metric and computes optimal paths from a source node src to all other reachable nodes in a mesh network. The embodiment is described for a special case where each node of the mesh has at most one wireless interface and all of the wireless interfaces are assigned to the same channel.

The path computation technique maintains, for any node x, selected variables associated with up to two paths. For each of the paths, the variables maintained optionally include respective cost and predecessor information. In some embodiments, the variables maintained omit other information about the paths (such as nodes along each path). In the following discussion, a prefix of "0" denotes a wired (or Ethernet) interface while a prefix of "1" denotes a wireless interface. The paths are:

Path[0](x): The currently known minimum cost path from node src to node x such that the last link is an Ethernet link; and Path[1](x): The currently known minimum cost path from node src to node x such that the last link is a wireless link.

Let Cost[i](x) denote the cost of the path Path[i](x), for i=0, 1. Cost[i](x) is represented by a 3-tuple where the first entry is a vector. Thus for i=0, 1:

$$\text{Cost}[i](x) = (\text{vectorInvSR}[i](x), \text{num\_wireless\_links}[i](x), \text{num\_hops}[i](x)).$$

The cost is alternatively represented by a 3-tuple where the first entry is a scalar value of the inverse of the sustainable data rate:

$$\text{Cost}[i](x) = (\text{InvSR}[i](x), \text{num\_wireless\_links}[i](x), \text{num\_hops}[i](x)).$$

Let Cost(x) denote the lexicographic-computed minimum of Cost[0](x) and Cost[1](x). Hence:

$$\text{Cost}(x) = \text{lexicographic\_minimum}(\text{Cost}[0](x), \text{Cost}[1](x)),$$

where lexicographic_minimum is computed according to the foregoing path comparison formula for paths having respective inverse sustainable data rates.

The path computation technique maintains predecessor information for paths Path[0](x) and Path[1](x). The representation of the predecessor of a node includes an identifier of a parent node and a type of shortest path from the parent node to the node (i.e. via a wired/Ethernet or wireless interface). Thus for i=0, 1 the predecessor at node x for Path[i](x) is given by:

$$\text{Pred}[i](x) = (\text{parent}[i](x), \text{type\_from\_parent}[i](x)).$$

Similar to Dijkstra's algorithm, the path computation technique proceeds by "marking" nodes one at a time. A set of "unmarked" nodes is maintained, and during each iteration a one node y among the unmarked nodes having the minimum Cost(y) is "marked". Then variables Cost[0](x) and Cost[1](x) of all unmarked nodes that are neighbors of the marked node y are updated (or reduced) via a process termed relaxation (see the section "Path Computation Implementation", located elsewhere herein, for more information). Appropriate variables are maintained and updated for up to two paths (corresponding to wired and wireless terminating links), thus enabling computation of an effective bandwidth path metric corresponding to possible optimal paths.

The computation also estimates bandwidth degradation across a contiguous sequence of wireless links by maintaining additional variables for a path ending in a wireless link.

WirelessHops[1](v)—Number of contiguous wireless links immediately preceding node v in the best known path to node v such that the last link is a wireless link; and WirelessTotalInvSR[1](v)—Inverse of the sustainable data rate on the entire sequence of contiguous wireless links immediately preceding node v in the best known path to node v such that the last link is a wireless link.

In some embodiments, the path computation assumes that any two wireless links (of a contiguous sequence of wireless links) that are on the same channel do interfere with each other. Even though interference within a contiguous sequence of wireless links ceases (or in some circumstances is ignorable) after links are IntfHops apart, the assumption tends to penalize paths with more wireless links even when the paths have higher sustainable data rates than paths with fewer wireless links. The assumption is in addition to penalizing paths having a similar sustainable data rate but a higher number of wireless links (i.e. the number of wireless links is second in the lexicographic ordering associated with path comparison). Use of more wireless resources creates interference for nearby links and networks and in some usage scenarios is undesirable. In some embodiments, the path computation assumes a penalty on a path proportional to the number of wireless links in the path while assuming interference between wireless links is negligible after IntfHops. The proportional penalty reduces apparent sustainable data rate by a fixed value at each wireless link even though the respective wireless link do not, in some usage scenarios, reduce the sustainable data rate when there is no additional interference experienced. See the section "Contiguous Wireless Links Sustainable Data Rate", located elsewhere herein, for further details.

Figure 3:
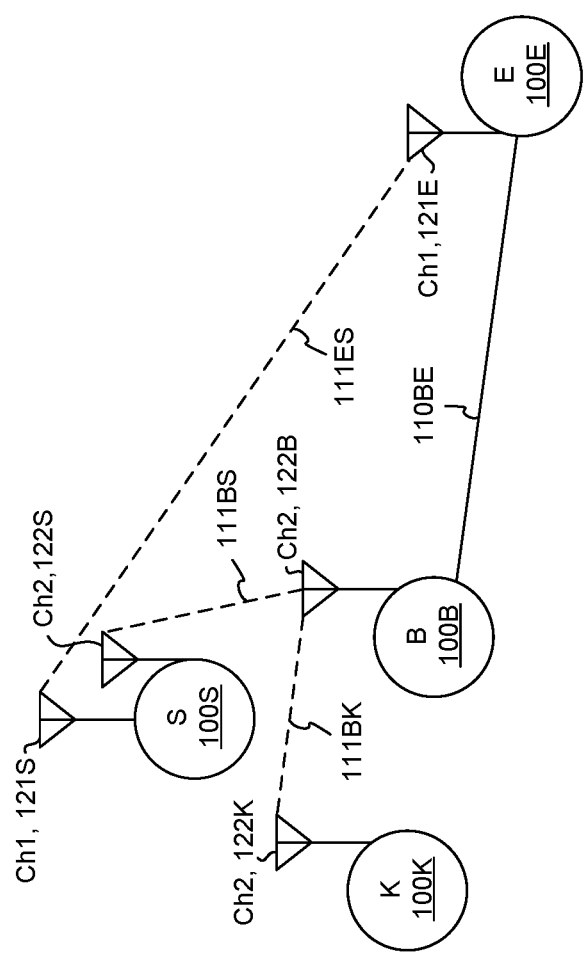
FIG. 3 illustrates portions of the mesh network of FIG. 1 for an example calculation of optimal paths.

FIG. 3 illustrates portions of the mesh network of FIG. 1 for an example calculation of optimal paths. For simplicity, the portion is shown with three of the nodes having only a single wireless interface and a fourth node having a pair of wireless interfaces. Three of the wireless interfaces operate on a single first channel (channel 2) and the remaining wireless interfaces operate on a non-interfering second channel (channel 1). The resulting communication pathways are three wireless links, two that interfere with each other (wireless links 111BK, and 111BS) and one that does not interfere with the others (wireless link 111ES). Further the portion is shown with only a single wired link (wired link 110BE). The optimal paths from a source node (Node 100S) to all other illustrated nodes (Nodes 100B, 100E, and 100K) are to be computed. The respective bandwidths assumed for the links are:

bandwidth(111BS)=40,
bandwidth(111ES)=30,
bandwidth(110BE)=30, and
bandwidth(111BK)=40.

The path computation considers two paths from Node 100S to Node 100B. The paths correspond to the previous link being a wired (Ethernet) link or the previous link being a wireless link. The variables corresponding to the first (previous link is wired) of the two paths are:

Path[0](Node 100B): [Node 100S]-[Node 100E]-[Node 100B] is a minimum cost path from Node 100S to Node 100B such that the previous link is an Ethernet link;
Cost[0](Node 100B)=(maximum(1/bandwidth(link 111ES), 1/bandwidth(link 110BE)), 1, 2); and
Pred[0](Node 100B)=(Node 100E, 1 (wireless)).

The variables corresponding to the second (previous link is wireless) of the two paths are:

Path[1](Node 100B): [Node 100S]-[Node 100B] is a minimum cost path from Node 100S to Node 100B such that the previous link is a wireless link;
Cost[1](Node 100B)=(1/bandwidth(link 111BS), 1, 1); and
Pred[1](Node 100B)=(Node 100S, null).

If bandwidth(link 111ES) is 30 and bandwidth(link 111BS) is 40, then in terms of the path metric, Path[1](Node 100B) has lower cost than Path[0](Node 100B) since 1/30 is greater than 1/40. However, because of interference between transmissions on two wireless links operating on the same channel (links 111BS and 111BK), the relative cost is reversed at Node 100K.

The path computation further considers two paths (with the previous link being respectively wired and wireless) from Node 100S to Node 100K. The variables corresponding to the first of the two paths (i.e. where the link preceding Node 100K is a wired link) are:

Path [0](Node 100K): No path exists; and
Cost(Node 100K)=(vectorInfinity, Infinity, Infinity).

The variables corresponding to the second of the two paths (i.e. where the link preceding Node 100K is a wireless link) are selected from the minimum of two candidate paths:

Candidate1:
Path[1](Node 100K): [Node 100S]-[Node 100B]-[Node 100K], i.e. Path[1](Node 100B) concatenated with link 111BK; and
Cost[1](Node 100K)=(1/bandwidth(link 111BS)+1/bandwidth(111BK), 2, 2), since transmissions on the two wireless links 111BS and 111BK do interfere with each other.

Candidate2:
Path[1](Node 100K): [Node 100S]-[Node 100E]-[Node 100B]-[Node 100K], i.e. Path [0](Node 100B) concatenated with link 111BK; and
Cost[1](Node 100K)=(maximum(1/bandwidth(link 111ES), 1/bandwidth(link 110BE), 1/bandwidth(link 111BK)), 2, 3).

If bandwidth(link 111BK) is 40, then the first candidate Cost(Node 100K) is (1/40+1/40, 2, 2) or (1/20, 2, 2). If bandwidth(link 110BE) is 30, then the second candidate Cost (Node 100K) is (maximum(1/30, 1/30, 1/40), 2, 3) or (1/30, 2, 3). The minimum of the two candidates is selected as (1/30, 2, 3).

Path Computation Implementation

FIGS. 4A-D illustrate various aspects of an embodiment of the path computation technique. In the following description of FIGS. 4A-D and associated pseudo-code, it is useful to understand the following notational conventions and context:

G=(V, E): A directed weighted graph, with a vertex set V (corresponding to nodes of the mesh network) and an edge set E (corresponding to wired and wireless links of the mesh network;

src: The source node for which all shortest paths are being computed;

S: The set of nodes for which all shortest (best) paths have been determined;

Q: A queue containing all nodes from V not already in S (i.e. all nodes not having final best paths computed with respect to src);

Adj[v]: The neighbors of node v (i.e. those nodes reachable from v in one wired or wireless hop); and b(u, v): The available link bandwidth on link(u, v).

The path metric corresponding to a path is a 3-tuple:
(vectorInvSR, num_wireless_links, num_hops)
where:
vectorInvSR is a vector representation of the inverse of the sustainable data rate along the path—in a single wireless interface scenario, the vector is size 2 (i.e. m+1 where m is one) where member 0 of the vector denotes Ethernet (wired) and member 1 denotes wireless;
num_wireless_links is the number of wireless links along the path; and
num_hops is the total number of hops (or links), wired and wireless, along the path.

Let Cost[0](v) be the (current minimum) cost metric of the best known path to node v such that the last link is an Ethernet (or wired) link. Also:

Pred[0](v)=(parent[0](v), type_from_parent[0](v))

is the predecessor of node v for Path[0](v), where parent[0](v) is the identifier of the parent node, and type_from_parent[0](v) indicates the type of path (i.e, Ethernet or wireless) to be taken from the parent.

Similarly, let Cost[1](v) be the (current minimum) cost metric of the best known path to node v such that the last link is a wireless link. Also:

Pred[1](v)=(parent[1](v), type_from_parent[1](v))

is the predecessor of node v for Path[1](v). For a path ending in a wireless link, two additional variables are maintained.
WirelessHops[1](v) is the number of contiguous wireless links immediately preceding node v in the best known path to node v such that the last link is a wireless link; and
WirelessTotalInvSR[1](v) is the inverse of the sustainable data rate on the entire sequence of contiguous wireless links immediately preceding node v in the best known path to node v such that the last link is a wireless link.

Let Cost(v) denote the minimum of Cost[0](v) and Cost[1](v). Thus:

Cost(v)=minimum(Cost[0](v), Cost[1](v))

using the foregoing lexicographic-computed comparison for 3-tuples.

Figure 4A:
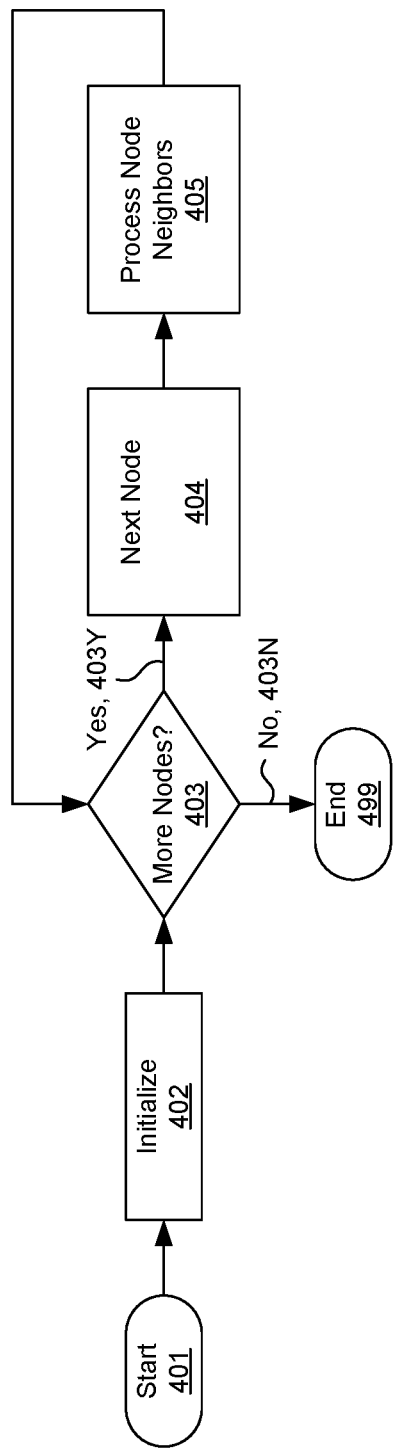
FIGS. 4A-D illustrate various aspects of an embodiment of a path computation technique.

FIG. 4A illustrates a top-level flow diagram of an embodiment of the path computation. Flow begins ("Start" 401) and continues to set various variables relating to the computation to starting values ("Initialize" 402). It is then determined if there are any remaining nodes to process ("More Nodes?" 403). If not ("No" 403N), then processing is complete ("End" 499). If so ("Yes", 403Y), then processing continues to select another node to process ("Next Node" 404). Best path information for all nodes adjacent to the selected node (i.e. one link away according to the topology of the mesh network) is then updated ("Process Node Neighbors" 405). Processing then flows back to determine if there are additional nodes to process ("More Nodes" 403).

Processing relating to "Initialize" 402 is described by the following pseudo-code:

```
For each node v in V {
    vectorInvSR[0](v) = vectorInfinity;
    num_wireless_links[0](v) = Infinity;
    num_hops[0](v) = Infinity;
    vectorInvSR[1](v) = vectorInfinity;
    num_wireless_links[1](v) = Infinity;
    num_hops[1](v) = Infinity;
    parent[0](v) = null;
    type_from_parent[0](v) = NA;
    parent[1](v) = null;
    type_from_parent[1](v) = NA;
    //
    vectorInvSR[0](src) = 0;
    num_wireless_links[0](src) = 0;
    num_hops[0](src) = 0;
    vectorInvSR[1](src) = 0;
    num_wireless_links[1](src) = 0;
    num_hops[1](src) = 0;
    WirelessHops[1](src) = 0;
    WirelessTotalInvSR[1](src) = 0;
}
S = nil;
Q = V;
``` where vectorInvSR is of size two and all elements therein are set to either zero or infinity as appropriate.

Processing relating to "More Nodes?" 403 is described by the following pseudo-code:
While (Q !=null)

Processing relating to "Next Node" 404 is described by the following pseudo-code:

```
S = AddNode(S, u);
Q = DeleteNode(Q, u);
``` where u is a node (or vertex in a directed graph context) such that:

Cost(u)=mininmum(Cost(v)) over all vertices v in Q.

In other words, u denotes the recently marked vertex.

Figure 4B:
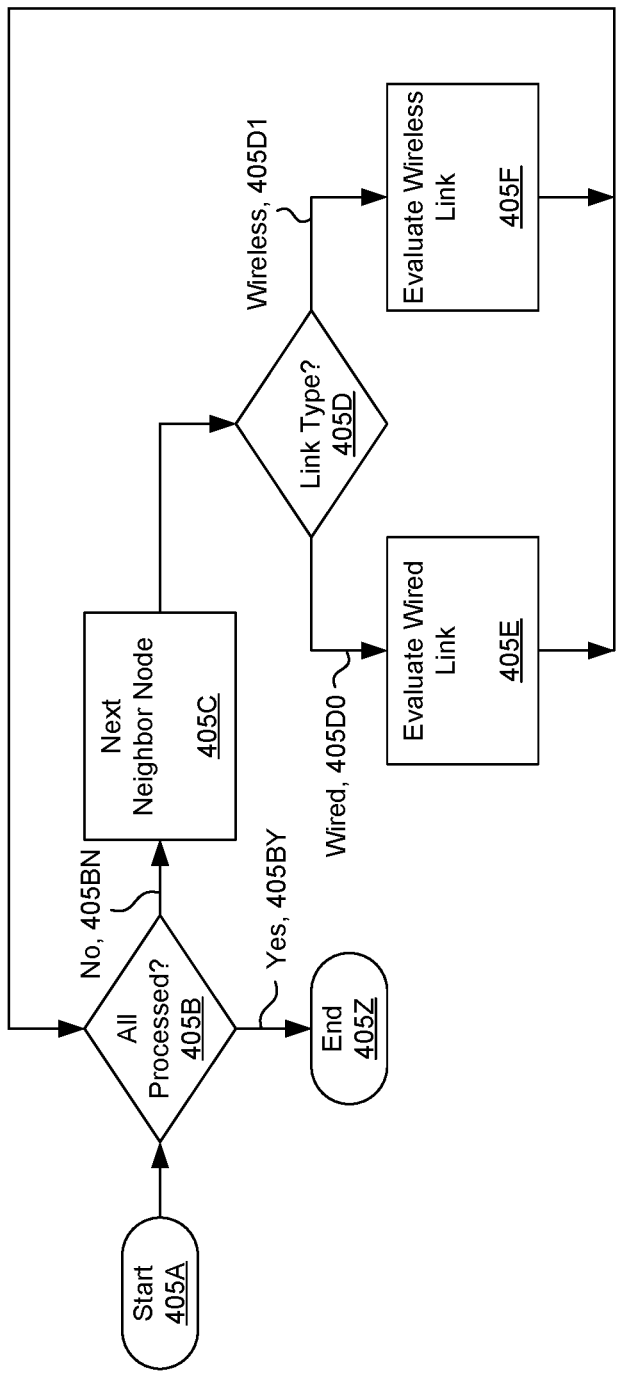

FIG. 4B illustrates an embodiment of processing associated with "Process Node Neighbors" 405 of FIG. 4A. Processing begins ("Start" 405A) and continues to check if all neighbor nodes have been completed ("All Processed?" 405B). If so ("Yes" 405BY), then processing is complete ("End" 405Z). If not ("No" 405BN), then processing proceeds to select a remaining node ("Next Neighbor Node" 405C). Flow then continues to determine whether the link type associated with the selected node is wired (i.e. Ethernet) or wireless ("Link Type?" 405D). If the link is wired ("Wired" 405D0), then flow proceeds to determine if the link enables a better path than previously known ("Evaluate Wired Link" 405E). If the link is wireless ("Wireless" 405D1), then flow continues to determine if the link enables a better path than what has been discovered before ("Evaluate Wireless Link" 405F). Processing to evaluate a wireless link is slightly different than processing a wired link, as described with respect to the FIG. 4C. After completing evaluation of the link (via either of "Evaluate Wired Link" 405E or "Evaluate Wireless Link" 405F) flow proceeds back to determine if more remain to be processed ("All Processed?" 405B).

Processing associated with "All Processed?" 405B is described by the following pseudo-code:
For each node v in Adj[u]
where processing associated with "Next Neighbor Node" 405C skips node v if v is already present in S.

Processing associated with "Link Type?" 405D is described by the following pseudo-code:

```
If (type of link(u, v) == Ethernet) {process according to 405E};
If (type of link(u, v) == wireless) {process according to 405F};
```

Figure 4C:
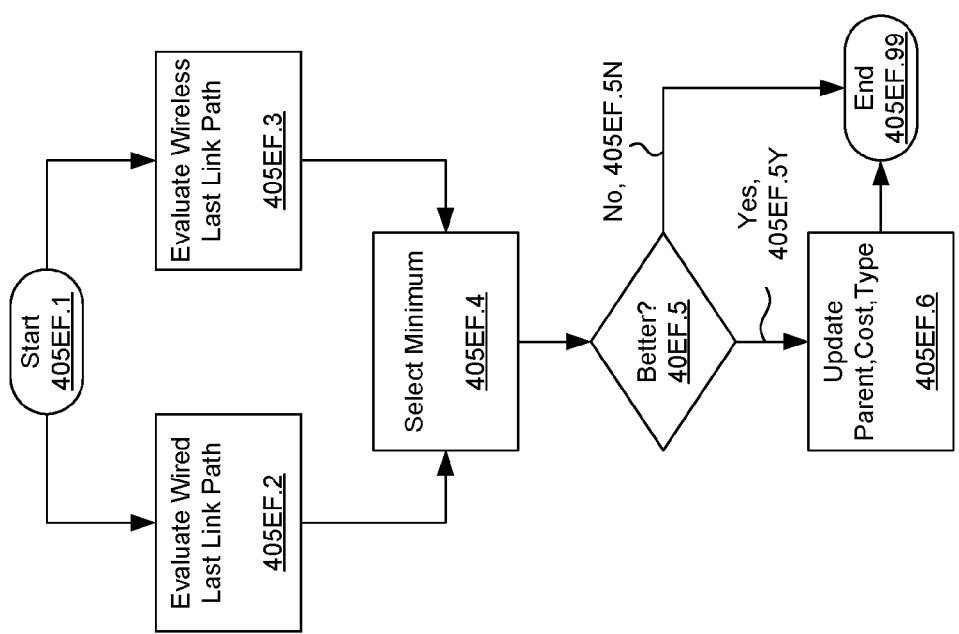

FIG. 4C illustrates an embodiment of processing associated with either of "Evaluate Wired Link" 405E and "Evaluate Wireless Link" 405F of FIG. 4B. Processing begins ("Start" 405EF.1) and proceeds to determine if a new best path is available based on a link currently being evaluated. The currently evaluated link is processed twice, according to two contexts, a first context where the last link in the path thus far is a wired link, and a second context where the last link in the path thus far is a wireless link. The first context ("Evaluate Wired Last Link Path" 405EF.2) and the second context ("Evaluate Wireless Last Link Path" 405EF.3) are evaluated independently and in any order (such as in parallel as illustrated), in some embodiments. After the evaluations, the minimum of the two is chosen ("Select Minimum" 405EF.4). Processing then continues to determine if a new best path has been discovered ("Better?" 405EF.5). If not ("No" 405EF.5N), then processing is complete ("End" 405EF.99). If so ("Yes" 405EF.5Y), then flow continues to save new information based on the new path ("Update Parent, Cost, Type" 405EF.6). Processing is then complete ("End" 405EF.99).

While the illustrated flow is representative of processing for either of a wired (or Ethernet) link and a wireless link, the wireless link processing is modified from and is described herein after the wired link processing. Processing associated with "Start" 405EF.1 during evaluation of a wired link is described by the following pseudo-code:

current_metric=Cost[0](v);

Processing associated with "Evaluate Wired Last Link Path" 405EF.2 further during evaluation of a wired link is described by the following pseudo-code:

candidate_metric0 = Cost[0](u);
candidate_metric0.vectorInvSR[0 := Ethernet] = maximum(1/b(u,v), candidate_metric0.vectorInvSR[0 := Ethernet]);
candidate_metric0.num_hops += 1;

Processing associated with "Evaluate Wireless Last Link Path" 405EF.3 is described by the following pseudo-code:

candidate_metric1 = Cost[1](u);
candidate_metric1.vectorInvSR[0 := Ethernet] = maximum(1/b(u,v), candidate_metric1.vectorInvSR[0 := Ethernet]);
candidate_metric1.num_hops += 1;

Processing associated with "Select Minimum" 405EF.4 is described by the following pseudo-code:

min_metric=minimum(candidate_metric0, candidate_metric1);

Processing associated with "Better?" 405EF.5 is described by the following pseudo-code:
If(min_metric<current_metric)
Processing associated with "Update Parent,Cost,Type" 405EF.6 is described by the following pseudo-code:

parent[0](v) = u;
If(candidate_metric0 == min_metric)
    Cost[0](v) = candidate_metric0;
    type_from_parent[0](v) = 0 // Ethernet (wired) link
If(candidate_metric1 == min_metric)
    Cost[0](v) = candidate_metric1;
    type_from_parent[0](v) = 1 // Wireless link The foregoing completes the processing during evaluation of a wired link.

Processing associated with a wireless link is a variation compared to the processing associated with a wireless link, as the following pseudo-code illustrates. Processing associated with "Start" 405EF.1 during evaluation of a wireless link is described by the following pseudo-code:

current_metric=Cost[1](v);

Processing associated with "Evaluate Wired Last Link Path" 405EF.2 further during evaluation of a wireless link is described by the following pseudo-code:

candidate_metric0 = Cost[0](u);
candidate_metric0.vectorInvSR[1 := Wireless] = maximum(1/b(u,v), candidate_metric0.vectorInvSR[1 := Wireless]);
candidate_metric0.num_wireless_links += 1;
candidate_metric0.num_hops += 1;

Processing associated with "Evaluate Wireless Last Link Path" 405EF.3 is described by the following pseudo-code:

candidate_metric1 = Cost[1](u);
InvB1 = candidate_metric1.vectorInvSR[1 := Wireless];
InvB2 = Wireless_TotalInvSR[1](u) + 1/b(u,v);
candidate_metric1.vectorInvSR[1 := Wireless] = maximum(InvB1, InvB2);
candidate_metric1.num_wireless_links += 1;
candidate_metric1.num_hops += 1;

Processing associated with "Select Minimum" 405EF.4 is described by the following pseudo-code:
min_metric=minimum(candidate_metric0, candidate_metric1);

Processing associated with "Better?" 405EF.5 is described by the following pseudo-code:
If[min_metric<current_metric)

Processing associated with "Update Parent,Cost,Type" 405EF.6 is described by the following pseudo-code:

parent[1](v) = u;
If(candidate_metric0 == min_metric)
    Cost[1](v) = candidate_metric0;
    type_from_parent[1](v) = 0 // Ethernet (wired) link
    WirelessHops[1](v) = 1;
    WirelessTotalInvSR[1](v) = 1/b(u,v)
If(candidate_metric1 == min_metric)
    Cost[1](v) = candidate_metric1;
    type_from_parent[1](v) = 1 // Wireless link;
    WirelessHops[1](v) = 1 + WirelessHops[1](u);
    WirelessTotalInvSR[1](v) = WirelessTotalInvSR[1](u) + 1/b(u,v)

The foregoing completes the processing during evaluation of a wireless link.

Contiguous Wireless Links Sustainable Data Rate

Evaluating bandwidth of a set of contiguous wireless links includes computing an effective bandwidth metric by assuming a wireless link interferes only with other wireless links that are on the same channel and within IntfHops wireless links away. In some embodiments, results of the computation is used in evaluating paths (such as computations performed with respect to one or more elements of FIG. 4B and FIG. 4C). In some embodiments, the results is used by a routing protocol that compares paths to each other and computes the effective bandwidth metric for respective paths.

Figure 4D:
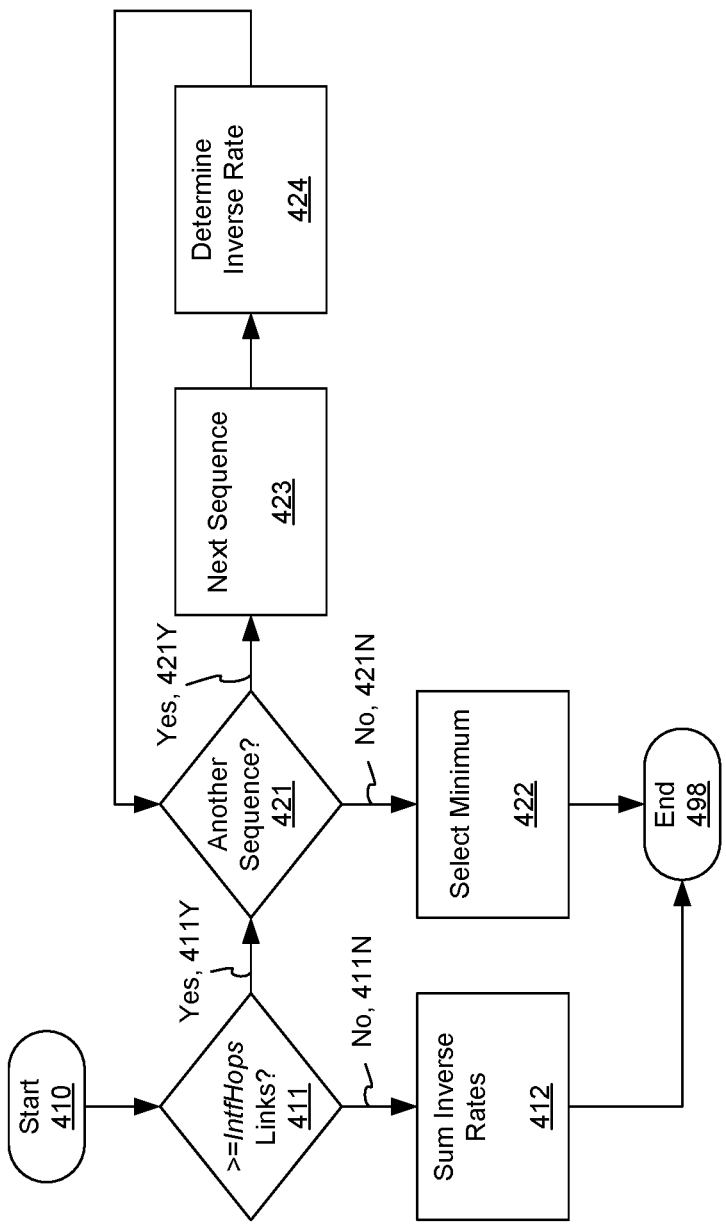

FIG. 4D illustrates an embodiment of processing associated with determining an effective sustainable data rate along a contiguous sequence of wireless links Processing begins ("Start" 410) and proceeds to determine if the number of contiguous links equals or surpasses a threshold (">=IntfHops Links?" 411). If not ("no" 411N), then adding reciprocal bandwidths over the path being processed is sufficient ("Sum Inverse Rates" 412) to determine an effective (inverse) data rate and processing is then complete ("End" 498).

If the threshold is met or exceeded ("Yes" 411Y), then an effective (inverse) bandwidth is computed for every contiguous sequence of wireless links within the path having a length equal to the threshold, and the minimum chosen as the effective (inverse) data rate. Processing for the sequences begins by determining if more sequences remain to be processed in the path ("Another Sequence?" 421). If not ("No" 421), then the smallest data rate of all of the sequences is chosen ("Select Minimum" 422). Processing is then complete ("End" 498). If more sequences remain to be processed ("Yes" 421Y), then flow continues to determine another sequence to process ("Next Sequence" 423). The effective (inverse) data rate for the next sequence is then computed ("Determine Inverse Rate" 424) and then processing flows back to determine if further sequences remain ("Another Sequence?" 421).

Pseudo-code implementing operations according to FIG. 4D corresponds to the function Wireless_InvSR_Function that receives two arguments:

vectorInvSR is a vector denoting the reciprocal of available bandwidth along each link of a contiguous sequence of wireless links of length p=|vectorInvSR|, where the $i^{th}$ entry of the vector is denoted InvSR(i), for i=1, 2 . . . p; and b(l) is available bandwidth of the wireless link appended at the end of the path.

The pseudo-code also refers to:

IntfHops is an (assumed or estimated) number of hops beyond which there is no additional bandwidth degradation due to interference between contiguous wireless links operating on the same channel, and in some scenarios is a small integer such as 4 or 5.

Processing associated with ">=IntfHops Links?" 411 is described by the following pseudo-code:
If(p<IntfHops)
or alternatively as:
If(p>=IntfHops)
Processing associated with "Sum Inverse Rates" 412 is described by the following pseudo-code:

```
FinalInvSR = 1/b(l) + sum{i=1 to p} InvSR(i)
return FinalInvSR
```

Processing associated with "Another Sequence?" 421, "Select Minimum" 422, "Next Sequence" 423, and "Determine Inverse Rate" 424 in combination is described by the following pseudo-code:

```
InvSR(p+1) = 1/b(l); // Append entry 1/b(l) at the end of the InvSR vector,
    resulting in a vector size of p+1
FinalInvSR = sum{i=1 to IntfHops} InvSR(i)
For(j = 1; j <= p+1 - IntfHops; ++j) {
    CandidateInvSR = 0;
    For (i =1; i <= IntfHops; ++i)
        CandidateInvSR += InvSR(j+i)
    If(CandiadateInvSR > FinalInvSR)
FinalInvSR = CandiadteInvSR
}
return FinalInvSR
```

Node Hardware and Software

Figure 5:
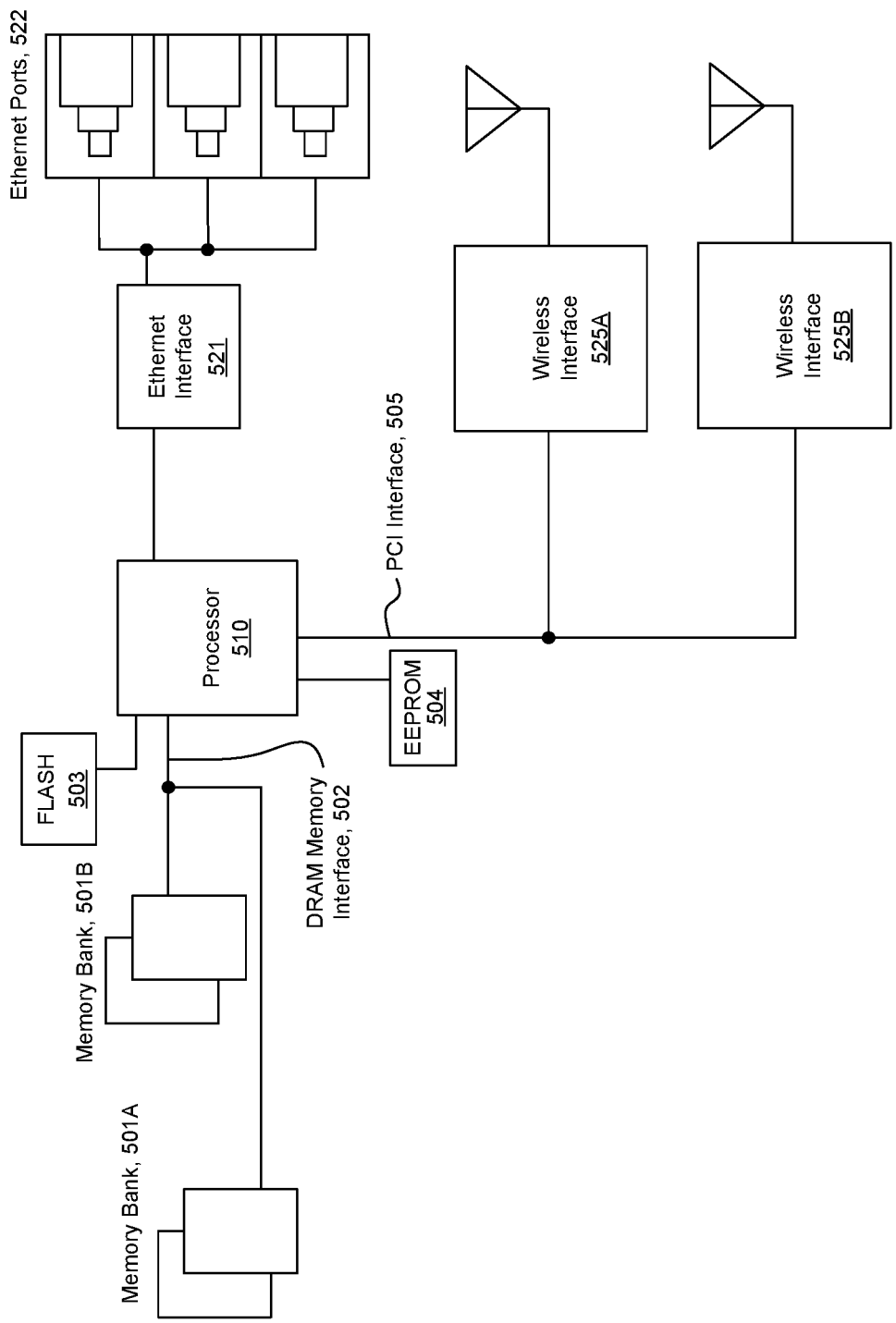
FIG. 5 illustrates selected details of hardware aspects of an embodiment of a node.

FIG. 5 illustrates selected details of hardware aspects of an embodiment of a node. The illustrated node includes Processor 510 coupled to various types of storage, including volatile read/write memory (Memory Banks 501A and 501) via Dynamic Randomly Accessible read/write Memory (DRAM) Memory Interface 502, and non-volatile read/write memory (FLASH 503 and Electrically Erasable Programmable Read Only Memory (EEPROM) 504). The processor is further coupled to Ethernet Interface 521 providing a plurality of Ethernet Ports 522 for establishing wired links, and via PCI Interface 505 to Wireless Interfaces 525A and 525B for providing radio communication of packets for establishing wireless links. In some embodiments, one or more of the wireless interfaces are compatible with an IEEE 802.11 wireless communication standard (such as any of 802.11a, 802.11b, and 802.11g). In some embodiments, one or more of the wireless interfaces operate (in conjunction with any combination of other hardware and software elements) to collect statistics with respect to neighboring nodes of a mesh. The statistics include any combination of signal strength and link quality, in various embodiments. In some embodiments, one or more of the wireless interfaces are configurable to drop all packets below a settable Received Signal Strength Indicator (RSSI) threshold. In some embodiments, one or more of the wired interfaces are 10 Mb, 100 Mb, 1 Ggb or 10 Gb compatible. Node implementations include any combination of wireless and wired interfaces, such as only a single wireless (or wired) interface, or one of each type, or two of each type. Other equivalent embodiments of a node are contemplated, as the illustrated partitioning is only one example.

The illustrated node optionally functions as any one of the mesh nodes illustrated in FIG. 1 (such as any of Node A 100A, Node S 100S, and so forth). The illustrated wireless interfaces of FIG. 5 enable communication between nodes and provide low-level transport for packets moving between elements of the mesh, such as by implementing wireless interfaces 121S and 122S associated with Node S 100S of FIG. 1. The Ethernet ports of FIG. 5 provide for wired communication between nodes, such as for implementing wired link 110CS associated with Node C 100C and Node S 100S of FIG. 1.

In operation the processor fetches instructions from any combination of the storage elements (DRAM, FLASH, and EEPROM) and executes the instructions. Some of the instructions correspond to execution of software associated with operations relating to processing for effective bandwidth path metric computation and path computation using the metric.

Figure 6:
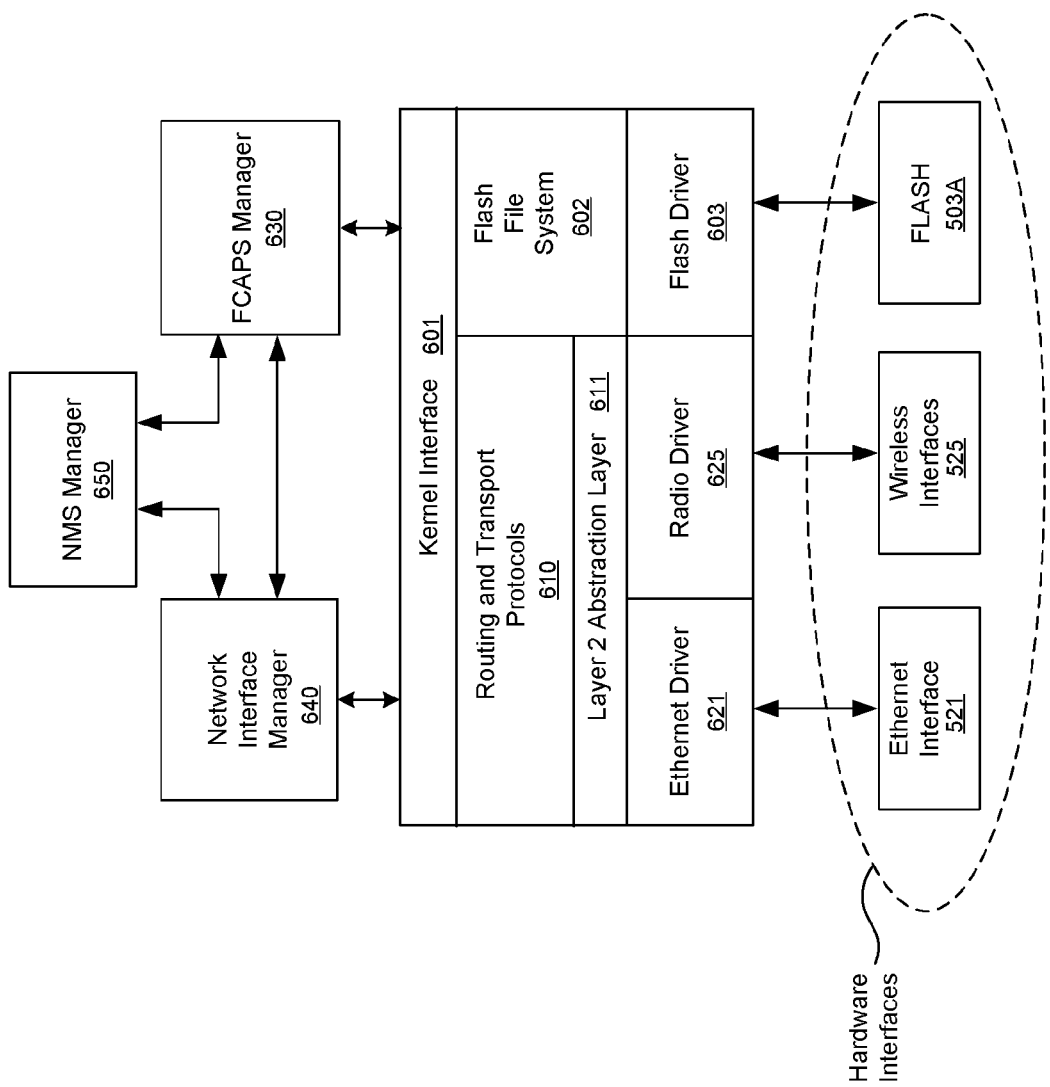
FIG. 6 illustrates selected details of software aspects of an embodiment of a node.

FIG. 6 illustrates selected details of software aspects of an embodiment of a node. The illustrated software includes Network Management System (NMS) Manager 650 interfacing to Network Interface Manager 640 and Fault, Configuration, Accounting, Performance, and Security (FCAPS) Manager 630. In some embodiments, the NMS interfaces between management software operating external to the node and software operating internal to the node (such as various applications and FCAPS). The Network Interface Manager manages physical network interfaces (such as the Ethernet and Wireless Interfaces). The Network Interface Manager assists the NMS in passing dynamic configuration changes (as requested by a user) through the management software to FCAPS. In some embodiments, FCAPS includes functions to store and retrieve configuration information, and FCAPS functions serve all applications requiring persistent configuration information. FCAPS, in some embodiments, assists in collecting fault information and statistics and performance data from various operating modules of the node. FCAPS optionally passes any portion of the collected information, statistics, and data to the NMS.

Kernel Interface 601 interfaces the Managers to Routing and Transport Protocols layer 610 and Flash File System module 602. The Routing Protocols include all or portions of processing relating to effective bandwidth path metric computation and path computations using the metric, as well as general processing relating to operation as a node of the mesh and forwarding packets. The Transport Protocols include TCP and UDP. The Flash File System module interfaces to Flash Driver 603 that is illustrated conceptually coupled to FLASH file hardware element 503A that is representative of a flash file system stored in any combination of FLASH 503 and EEPROM 504 of FIG. 5. Layer-2 Abstraction Layer 611 interfaces the Routing and Transport Protocols to Ethernet Driver 621 and Radio Driver 625. The Ethernet Driver is illustrated conceptually coupled to Ethernet Interface 521 of FIG. 5. The Radio Driver is illustrated conceptually coupled to Wireless Interfaces 525, representative of Wireless Interfaces 525A and 525B of FIG. 5. In some embodiments, the software also includes a serial driver. The software is stored on a computer readable medium (such as any combination of the DRAM, FLASH, and EEPROM elements of FIG. 5), and is executed by the processor of FIG. 5. The partitioning illustrated in FIG. 6 is an example only, and many other equivalent arrangements of layers and modules are contemplated.

CONCLUSION

Certain choices have been made in the presentation of this disclosure merely for reasons of convenience in preparing the text and drawings and unless there is an indication to the contrary these choices of convenience should not be construed per se as conveying additional information regarding the structure of the embodiments illustrated. Illustrative examples of such choices of convenience include: the particular organization or assignment of the designations used for the figure numbering and the particular organization or assignment of the element identifiers (i.e., the callouts or numerical designators) used to identify and reference the features and elements of the embodiments.

Although the foregoing embodiments have been described in some detail for purposes of clarity of understanding, the invention is not limited to the details provided. There are many ways of implementing the invention. The disclosed embodiments are illustrative and not restrictive.

It will be understood that many variations in construction, arrangement and use are possible consistent with the teachings and within the scope of the claims appended to the issued patent. For example, interconnect and function-unit bit-widths, clock speeds, and the type of technology used may generally be varied in each component block. The names given to interconnect and logic are merely illustrative, and should not be construed as limiting the concepts taught. The order and arrangement of flowchart and flow diagram process, action, and function elements may generally be varied. Also, unless specifically stated to the contrary, the value ranges specified, the maximum and minimum values used, or other particular specifications (such as number and type of wired and wireless interfaces; and the number of entries or stages in registers and buffers), are merely those of the illustrative embodiments, may be expected to track improvements and changes in implementation technology, and should not be construed as limitations.

Functionally equivalent techniques known to those of ordinary skill in the art may be employed instead of those illustrated to implement various components, sub-systems, functions, operations, routines, and sub-routines. It is also understood that many design functional aspects may be carried out in either hardware (i.e., generally dedicated circuitry) or software (i.e., via some manner of programmed controller or processor), as a function of implementation dependent design constraints and the technology trends of faster processing (which facilitates migration of functions previously in hardware into software) and higher integration density (which facilitates migration of functions previously in software into hardware). Specific variations may include, but are not limited to: differences in partitioning; different form factors and configurations; use of different operating systems and other system software; use of different interface standards, network protocols, or communication links; and other variations to be expected when implementing the concepts taught herein in accordance with the unique engineering and business constraints of a particular application.

The embodiments have been illustrated with detail and environmental context well beyond that required for a minimal implementation of many of aspects of the concepts taught. Those of ordinary skill in the art will recognize that variations may omit disclosed components or features without altering the basic cooperation among the remaining elements. It is thus understood that much of the details disclosed are not required to implement various aspects of the concepts taught. To the extent that the remaining elements are distinguishable from the prior art, components and features that may be so omitted are not limiting on the concepts taught herein.

All such variations in design comprise insubstantial changes over the teachings conveyed by the illustrative embodiments. It is also understood that the concepts taught herein have broad applicability to other computing and networking applications, and are not limited to the particular application or industry of the illustrated embodiments. The invention is thus to be construed as including all possible modifications and variations encompassed within the scope of the claims appended to the issued patent.

What is claimed is:
1. A node comprising:
    a processor;
    a memory;
    a wireless interface; and
    wherein the processor is enabled to execute instructions fetched from the memory to perform:
        computing an effective wireless bandwidth for a particular path according to one of a plurality of techniques, the particular path having a length of contiguous wireless links,
        conditionally selecting a first one of the techniques when the length is a first value and conditionally selecting a second one of the techniques when the length is a second value different from the first value,
        determining, in accordance with the effective wireless bandwidth, a best path through a mesh network the node is operable in, the best path including the contiguous wireless links and at least one wired link, and
        routing traffic, at least in part via the processor and the wireless interface, according to the best path.
2. The node of claim 1, wherein the computing comprises calculating bandwidth reduction due to the contiguous wireless links.

3. The node of claim 1, wherein the computing comprises evaluating at least a first current path and a second current path, the first current path having a last link that is a wired link and the second current path having a last link that is a wireless link.

4. The node of claim 1, wherein the first value is less than a threshold and the second value is greater than the threshold.

5. The node of claim 4, wherein the first technique comprises calculating a first effective wireless bandwidth as a first function of a reciprocal of an inverse resultant data rate, the inverse resultant data rate being a sum of respective reciprocal bandwidths corresponding to each of the contiguous wireless links.

6. The node of claim 4, wherein the second technique comprises calculating a second effective wireless bandwidth as a second function of a reciprocal of plurality of inverse resultant data rates corresponding to a respective set of particular contiguous wireless links, each of the sets having a respective particular length equal to the threshold.

7. A method comprising:
computing an effective wireless bandwidth for a particular path according to one of a plurality of techniques, the particular path having a length of contiguous wireless links;
conditionally selecting a first one of the techniques when the length is a first value and conditionally selecting a second one of the techniques when the length is a second value different from the first value;
determining, in accordance with the effective wireless bandwidth, a best path through a mesh network, the best path including the contiguous wireless links and at least one wired link;
routing traffic, at least in part via a wireless interface of a node of the mesh network, according to the best path; and
wherein the computing, the conditionally selecting, and the determining are performed in the node at least in part via a processor of the node fetching and executing instructions from a memory of the node.

8. The method of claim 7, wherein the computing comprises calculating bandwidth reduction due to the contiguous wireless links.

9. The method of claim 7, wherein the computing comprises evaluating at least a first current path and a second current path, the first current path having a last link that is a wired link and the second current path having a last link that is a wireless link.

10. The method of claim 7, wherein the first value is less than a threshold and the second value is greater than the threshold.

11. The method of claim 10, wherein the first technique comprises calculating a first effective wireless bandwidth as a first function of a reciprocal of an inverse resultant data rate, the inverse resultant data rate being a sum of respective reciprocal bandwidths corresponding to each of the contiguous wireless links.

12. The method of claim 10, wherein the second technique comprises calculating a second effective wireless bandwidth as a second function of a reciprocal of plurality of inverse resultant data rates corresponding to a respective set of particular contiguous wireless links, each of the sets having a respective particular length equal to the threshold.

13. A computer readable non-transitory medium having a set of instructions stored therein which when executed by a processing element causes the processing element to perform operations comprising:
computing an effective wireless bandwidth for a particular path according to one of a plurality of techniques, the particular path having a length of contiguous wireless links;
conditionally selecting a first one of the techniques when the length is a first value and conditionally selecting a second one of the techniques when the length is a second value different from the first value;
determining, in accordance with the effective wireless bandwidth, a best path through a mesh network, the best path including the contiguous wireless links and at least one wired link; and
routing traffic, at least in part via a wireless interface of a node of the mesh network, according to the best path.

14. The computer readable non-transitory medium of claim 13, wherein the computing comprises calculating bandwidth reduction due to the contiguous wireless links.

15. The computer readable non-transitory medium of claim 13, wherein the computing comprises evaluating at least a first current path and a second current path, the first current path having a last link that is a wired link and the second current path having a last link that is a wireless link.

16. The computer readable non-transitory medium of claim 13, wherein the first value is less than a threshold and the second value is greater than the threshold.

17. The computer readable non-transitory medium of claim 16, wherein the first technique comprises calculating a first effective wireless bandwidth as a first function of a reciprocal of an inverse resultant data rate, the inverse resultant data rate being a sum of respective reciprocal bandwidths corresponding to each of the contiguous wireless links.

18. The computer readable non-transitory medium of claim 16, wherein the second technique comprises calculating a second effective wireless bandwidth as a second function of a reciprocal of plurality of inverse resultant data rates corresponding to a respective set of particular contiguous wireless links, each of the sets having a respective particular length equal to the threshold.

19. A system comprising:
means for computing an effective wireless bandwidth for a particular path according to one of a plurality of techniques, the particular path having a length of contiguous wireless links;
means for conditionally selecting a first one of the techniques when the length is a first value and conditionally selecting a second one of the techniques when the length is a second value different from the first value;
means for determining, in accordance with the effective wireless bandwidth, a best path through a mesh network, the best path including the contiguous wireless links and at least one wired link; and
means for routing traffic, at least in part via a wireless interface of a node of the mesh network, according to the best path.

20. The system of claim 19, wherein the computing comprises calculating bandwidth reduction due to the contiguous wireless links.

21. The system of claim 19, wherein the computing comprises evaluating at least a first current path and a second current path, the first current path having a last link that is a wired link and the second current path having a last link that is a wireless link.

22. The system of claim 19, wherein the first value is less than a threshold and the second value is greater than the threshold.

23. The system of claim 22, wherein the first technique comprises calculating a first effective wireless bandwidth as a first function of a reciprocal of an inverse resultant data rate, the inverse resultant data rate being a sum of respective reciprocal bandwidths corresponding to each of the contiguous wireless links; and wherein the second technique comprises calculating a second effective wireless bandwidth as a second function of a reciprocal of plurality of inverse resultant data rates corresponding to a respective set of particular contiguous wireless links, each of the sets having a respective particular length equal to the threshold.

* * * * *